United States Patent
Head et al.

(10) Patent No.: US 9,467,712 B2
(45) Date of Patent: *Oct. 11, 2016

(54) SCALABLE IMAGE DISTRIBUTION IN VIRTUALIZED SERVER ENVIRONMENTS

(75) Inventors: Michael R. Head, Tarrytown, NY (US); Andrzej Kochut, Croton-on-Hudson, NY (US); Hidayatullah H. Shaikh, Shrub Oak, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,414

(22) Filed: Sep. 11, 2012

(65) Prior Publication Data

US 2013/0004089 A1 Jan. 3, 2013

Related U.S. Application Data

(63) Continuation of application No. 13/053,489, filed on Mar. 22, 2011, now Pat. No. 9,326,001.

(51) Int. Cl.
*G06K 9/00* (2006.01)
*H04N 19/507* (2014.01)

(52) U.S. Cl.
CPC .................................. *H04N 19/507* (2014.11)

(58) Field of Classification Search
None
See application file for complete search history.

(56) References Cited

U.S. PATENT DOCUMENTS

| | | | |
|---|---|---|---|
| 6,460,045 B1 * | 10/2002 | Aboulnaga et al. | |
| 6,633,685 B1 * | 10/2003 | Kusama et al. | 382/284 |
| 6,922,831 B1 * | 7/2005 | Kroening et al. | 717/172 |
| 7,246,200 B1 * | 7/2007 | van Rietschote | G06F 9/4403 709/220 |
| 7,870,039 B1 * | 1/2011 | Dom et al. | 705/26.41 |
| 8,499,114 B1 * | 7/2013 | Vincent | G06F 9/5077 711/147 |
| 8,706,947 B1 * | 4/2014 | Vincent | G06F 9/5077 711/206 |
| 8,938,572 B1 * | 1/2015 | Vincent | G06F 9/5077 711/154 |
| 2004/0264806 A1 * | 12/2004 | Herley | G06T 5/50 382/284 |
| 2005/0240563 A1 * | 10/2005 | Domany et al. | 707/1 |
| 2007/0057958 A1 * | 3/2007 | Bucher | G06F 9/455 345/568 |
| 2007/0078846 A1 * | 4/2007 | Gulli et al. | 707/5 |
| 2007/0110338 A1 * | 5/2007 | Snavely | G06F 17/30274 382/305 |
| 2007/0140125 A1 * | 6/2007 | Pessi | H03M 7/3084 370/236 |
| 2007/0299897 A1 * | 12/2007 | Reznik | 708/409 |
| 2008/0222375 A1 * | 9/2008 | Kotsovinos | G06F 9/5083 711/162 |
| 2008/0287196 A1 * | 11/2008 | Miki et al. | 463/42 |
| 2009/0285496 A1 * | 11/2009 | Collins | G06F 3/14 382/232 |
| 2009/0307247 A1 * | 12/2009 | Pollack | 707/101 |
| 2010/0138827 A1 * | 6/2010 | Frank et al. | 718/1 |
| 2010/0257523 A1 * | 10/2010 | Frank | 718/1 |

(Continued)

*Primary Examiner* — Aaron W Carter (74) *Attorney, Agent, or Firm* — Tutunjian & Bitetto, P.C.; Louis J. Percello (57) ABSTRACT

A method and system include replicating an image representing a sequence of bytes on a local storage medium on a target device by determining a similarity between images and reconstructing a new image using equivalent blocks from one or more similar images locally available on the target device or available on donor devices to reduce network link usage and transfer time in replicating the image.

23 Claims, 3 Drawing Sheets

(56) References Cited

U.S. PATENT DOCUMENTS

| | | | | |
|---|---|---|---|---|
| 2010/0281208 A1* | 11/2010 | Yang | G06F 3/0611 | 711/103 |
| 2011/0145816 A1* | 6/2011 | Glikson | G06F 9/45558 | 718/1 |
| 2011/0208908 A1* | 8/2011 | Chou et al. | | 711/112 |
| 2011/0219372 A1* | 9/2011 | Agrawal | G06F 9/45558 | 718/1 |
| 2012/0005346 A1* | 1/2012 | Burckart | G06F 9/5077 | 709/226 |
| 2012/0066677 A1* | 3/2012 | Tang | G06F 9/4856 | 718/1 |
| 2012/0084445 A1* | 4/2012 | Brock | G06F 9/5077 | 709/226 |
| 2012/0110574 A1* | 5/2012 | Kumar | G06F 9/45558 | 718/1 |
| 2012/0124012 A1* | 5/2012 | Provenzano et al. | | 707/692 |
| 2012/0192175 A1* | 7/2012 | Dorai | G06F 9/45558 | 718/1 |
| 2012/0240110 A1* | 9/2012 | Breitgand | G06F 9/45558 | 718/1 |
| 2012/0243795 A1* | 9/2012 | Head | H04N 19/507 | 382/218 |
| 2012/0278295 A1* | 11/2012 | Hildebrand | G06F 17/30132 | 707/705 |
| 2012/0324446 A1* | 12/2012 | Fries | G06F 21/64 | 718/1 |
| 2013/0004089 A1* | 1/2013 | Head | H04N 19/507 | 382/218 |
| 2013/0007733 A1* | 1/2013 | Fries | G06F 8/68 | 718/1 |
| 2013/0132954 A1* | 5/2013 | Bolte | G06F 8/63 | 718/1 |
| 2013/0198745 A1* | 8/2013 | De | G06F 9/45533 | 718/1 |
| 2014/0052698 A1* | 2/2014 | Chen | G06F 9/45558 | 707/692 |
| 2014/0222953 A1* | 8/2014 | Karve | G06F 9/455 | 709/217 |
| 2014/0237479 A1* | 8/2014 | Baset | G06F 9/5033 | 718/104 |
| 2014/0286566 A1* | 9/2014 | Rhoads | H04N 13/0275 | 382/154 |
| 2015/0012487 A1* | 1/2015 | Ashok | G06F 8/60 | 707/610 |
| 2016/0077863 A1* | 3/2016 | Karve | G06F 9/455 | 718/1 |

* cited by examiner

SCALABLE IMAGE DISTRIBUTION IN VIRTUALIZED SERVER ENVIRONMENTS

RELATED APPLICATION DATA

This application is a Continuation application of co-pending U.S. patent application Ser. No. 13/053,489 filed on Mar. 22, 2011, incorporated herein by reference in its entirety.

BACKGROUND

1. Technical Field

The present invention relates to image distribution in network environments and more particularly to scalable image distribution systems and methods.

2. Description of the Related Art

"Infrastructure as a Service" (IaaS) clouds offer the capability of provisioning and using virtual machine instances preconfigured with software stacks. Typically, such an IaaS cloud has an image catalog from which users choose and request deployment (instantiation) of a virtual machine (VM). Examples of catalog entries include Red Hat Enterprise Linux 5.5, Red Hat Enterprise Linux 5.5 with DB2™ 7.0, Windows XP™ with Microsoft Office™, etc.

Deployed virtual machines execute in a data center on large numbers (tens of thousands) of distributed servers. The images (from which VM instances are created) are stored on a set of storage servers. In such a system VM instances are constantly created and deleted based on user requests.

There are generally two ways of providing storage for VM instances (precisely, for storing files representing their root directories). These include 1) using a local storage server where the VM runs, and 2) using a centralized server accessed using a storage access protocol (such as NFS™, iSCSI™, Fiber Channel Protocol, etc.).

The VM images may be stored by "SIMPLE_COPY", which is a direct image copy from the storage server to a local storage of the target server. "STREAMING_COW" (COW=copy on write) streams the image from the storage server to the local storage of the target server and starts the VM as soon as a minimum required number of blocks is available locally. All blocks written by the VM are stored on the local storage device of the server. "STREAMING_COW_COR" (COR=copy on read) streams the image from the storage server to the local storage of the target server and starts the VM as soon as a minimum required number of blocks is available locally. All blocks written by the VM are stored on the local storage device of the server. In addition, all blocks read from the storage server are also stored on the local storage of the target server. "STREAMING_COW_COR_LAZY" is the same as "STREAMING_COW_COR", except the streaming rate is controlled based on the network conditions.

The "SIMPLE_COPY" solution requires at least as much time to start the VM as the time to copy entire image between the storage server and the local storage of the target server. The amount of data sent is equal to the image size. A number of input/output (I/O) operations on the storage server is equal to reading all of the blocks of the image. The process is repeated with no change for every provisioning request.

The "STREAMING_COW" solution decreases (as compared to SIMPLE_COPY) the time between request and starting the VM since the VM is started as soon as the minimum required number of blocks is downloaded. However, it does not reduce the amount of data transferred between the storage server and the target host. In addition, for each block that is read but not written, each time VM reads it, the block is transferred over the network.

The "STREAMING_COW_COR" solution improves over the "STREAMING_COW" by copying not only written but also read blocks on the local storage device of the target server. This removes redundant transfers for the blocks that are read multiple times. The transfer proceeds without interruption until all of the blocks are available on the local storage of the target server. Therefore, this solution inherits all of the remaining problems of the "SIMPLE_COPY" solution (in terms of amount of data transferred).

The "STREAMING_COW_COR_LAZY" is similar to the "STREAMING_COW_COR", except the streaming process is dynamically adjusted to network conditions. That is, the streaming stops if the network between the target host and the storage server is congested and resumes when the congestion resolves. Therefore, the total amount of data transferred is the same as in "STREAMING_COW_COR", but the time may be significantly increased.

SUMMARY

A method and system include replicating an image representing a sequence of bytes on a local storage medium on a target device by determining a similarity between images and reconstructing a new image using equivalent blocks from one or more similar images locally available on the target device or available on donor devices to reduce network link usage and transfer time in replicating the image.

Another method includes determining a similarity between images in a distributed network; determining an image dependency matrix denoting a fraction of blocks that are identical between pairs of images; searching local storage for blocks to reconstruct a new image using the image dependency matrix; if all blocks needed for the new image are not in local storage, querying donor hosts for the blocks to reconstruct the new image using the image dependency matrix; and if all blocks needed for the new VM are not in available from the donor hosts, accessing a storage server to find remaining blocks needed to reconstruct the new image.

A system includes a plurality of images stored on nodes of a distributed network. A distributed virtual server optimizer (DVSO) is stored on a storage medium at one or more nodes in the network, the DVSO being configured to compare images in the network to determine a similarity between blocks of the images and to generate a dependency matrix indicating the similarity between the images. A target host is configured to reconstruct a new image. The target host employs the dependency matrix to locally find similar images on the target host with needed blocks for reconstructing the new image, and, if not locally found, to find donor hosts to provide the needed blocks to reduce network link usage.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a storage system and method for reconstructing images or templates (e.g., virtual machine (VM) instances). The present principles takes advantage of local storage and similarities between other locally stored images to increase performance and reduce transport time. In particular, present embodiments instantiate VMs on a local drive of a target server (where the VM is intended to run).

The present principles minimize the time between receiving a request and a time when a VM is started (even if not all of the blocks of the image are locally available); minimize the time between the receiving request and the time when all of the image blocks comprising a requested image are on the local storage of the target server; minimize the network traffic on the network connecting servers and storage server; and minimize a number of input/output (I/O) operations on the storage server due to VM provisioning operations. None of the conventional solutions described above achieve all of these features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
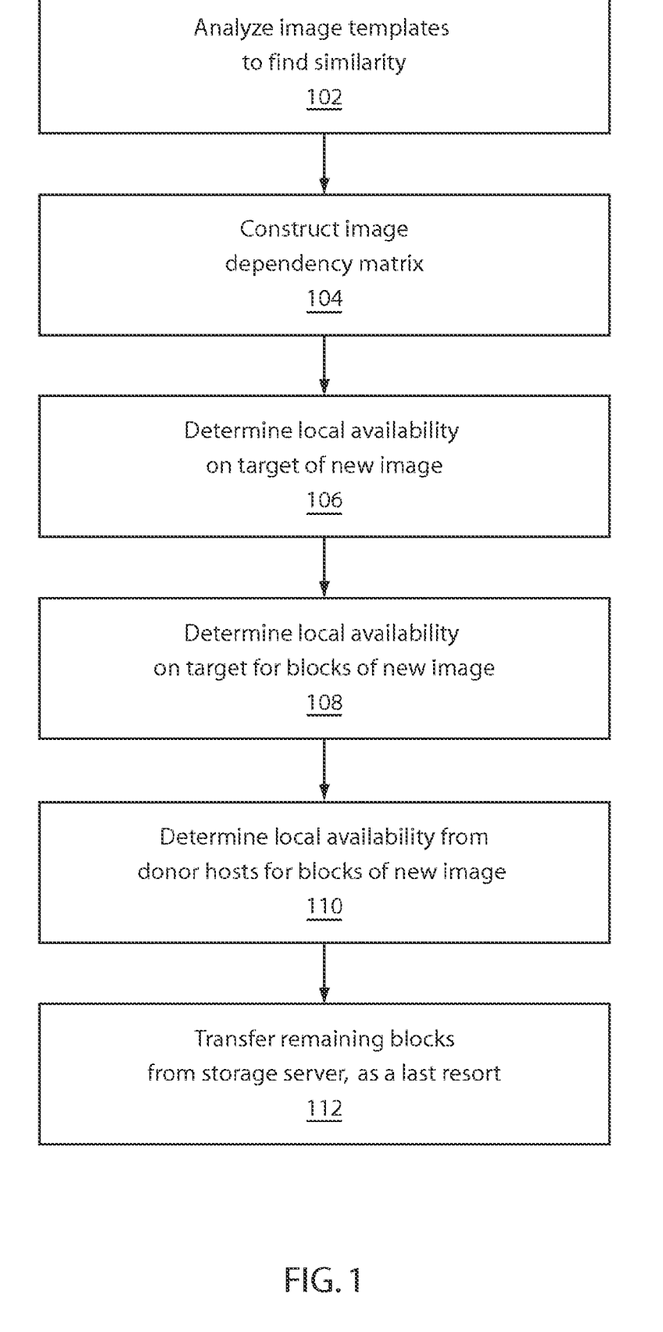
FIG. 1 is a block/flow diagram showing a system/method for deploying a virtual machine by reconstructing the virtual machine from local blocks in accordance with one embodiment.

Referring now to the drawings in which like numerals represent the same or similar elements and initially to FIG. 1, a block/flow diagram illustratively shows a system/method for scalable image distribution in accordance with the present principles. In block 102, images or templates on a storage server are analyzed to detect similarity at the block level. A checksum technique, such as MD5 or the like, may be followed by a byte-by-byte comparison of blocks with a same hashcode. This is used to identify identical blocks. Images or templates may include a sequence of information (e.g., bytes) representing read-only information employed for instantiating an application or system. For example, an image of a hard drive includes a read-only version all of the programs at a given time or state.

In block 104, based on the similarity analysis in block 102, an image dependency matrix S is constructed. For N images the matrix has dimension of N×N. Element S(a,b) contains a number between 0 and 1 denoting a fraction of blocks between the two images that are identical. Also, an index describing which blocks are identical is stored for each pair of images.

In block 106, when a new image or template (e.g., a virtual machine (VM)) has to be provisioned (or migrated) to a target server, a determination is made as to whether the same image is already available on the local storage of the server. If so, the local image is used to create a copy-on-write and a copy-on-read image or VM instance. No transfer of data between the storage server and target host is performed. This ensures that the network traffic on the network connecting servers and storage server is reduced or minimized, and a number of input/output (I/O) operations on the storage server due to provisioning operations is reduced or minimized. Also, since the creation is local, the time between receiving a request and a time when a VM is started (even if not all of the blocks of the image are locally available) and the time between receiving request and the time when all of the image blocks comprising a requested image are on the local storage of the target server are greatly reduced as compared to the known conventional solutions.

In block 108, if the same image is not already available on the local storage of the target server, the system checks the image dependency matrix and computes a list of images having a largest non-overlapping common set of blocks with the image that needs to be deployed. Based on the obtained list, the system searches local attached storage (donor hosts) of the target server for those images. If found, the system creates copy-on-write and copy-on-read VM instances based on these blocks (potentially rebuilding the image first by copying the blocks, or, in more advanced implementation, retaining links to read-only blocks of base images).

Again, the network traffic on the network connecting servers and storage server is reduced or minimized, and a number of input/output (I/O) operations on the storage server due to VM provisioning operations is reduced or minimized. Also, since the creation is local, the time between receiving a request and a time when a VM is started (even if not all of the blocks of the image are locally available) and the time between receiving request and the time when all of the image blocks comprising a requested image are on the local storage of the target server are greatly reduced as compared to the known conventional solutions.

In block 110, if not all of the blocks needed to rebuild a target image are available on the local storage of the target host, then the system searches for missing blocks on local attached storage of "donor hosts". A "donor host" is a host having at least some of the needed blocks on its local attached storage. The system transfers the blocks from the donor hosts and combines them with locally available blocks to rebuild the image. VM instances are created as before when the images are complete. No network transfers from the storage server are needed. Also, latency times are better than in known solutions because a large fraction of blocks are local and the rest may be found on servers close in network proximity (e.g., same rack). To disseminate information about which host has which images (for finding donor hosts) known peer-to-peer file sharing techniques may be employed. In another embodiment, latency times may be evaluated in advance to determine preferred donor hosts in the network. The preferred donor host would then be checked first to complete the image blocks. In still other embodiments, other costs and criteria (e.g., security, trust evaluations, etc.) may be employed for selecting hosts.

In block 112, if there are no donor hosts having all the needed blocks, the missing blocks are transferred from the storage server. This situation becomes unlikely as the size of the network or cloud and number of images deployed grows. Still, access times and operations are improved as compared with known solutions, because a large fraction of the blocks is either available locally or on "donor hosts"—only a fraction needs to be transferred from the storage server.

Figure 2:
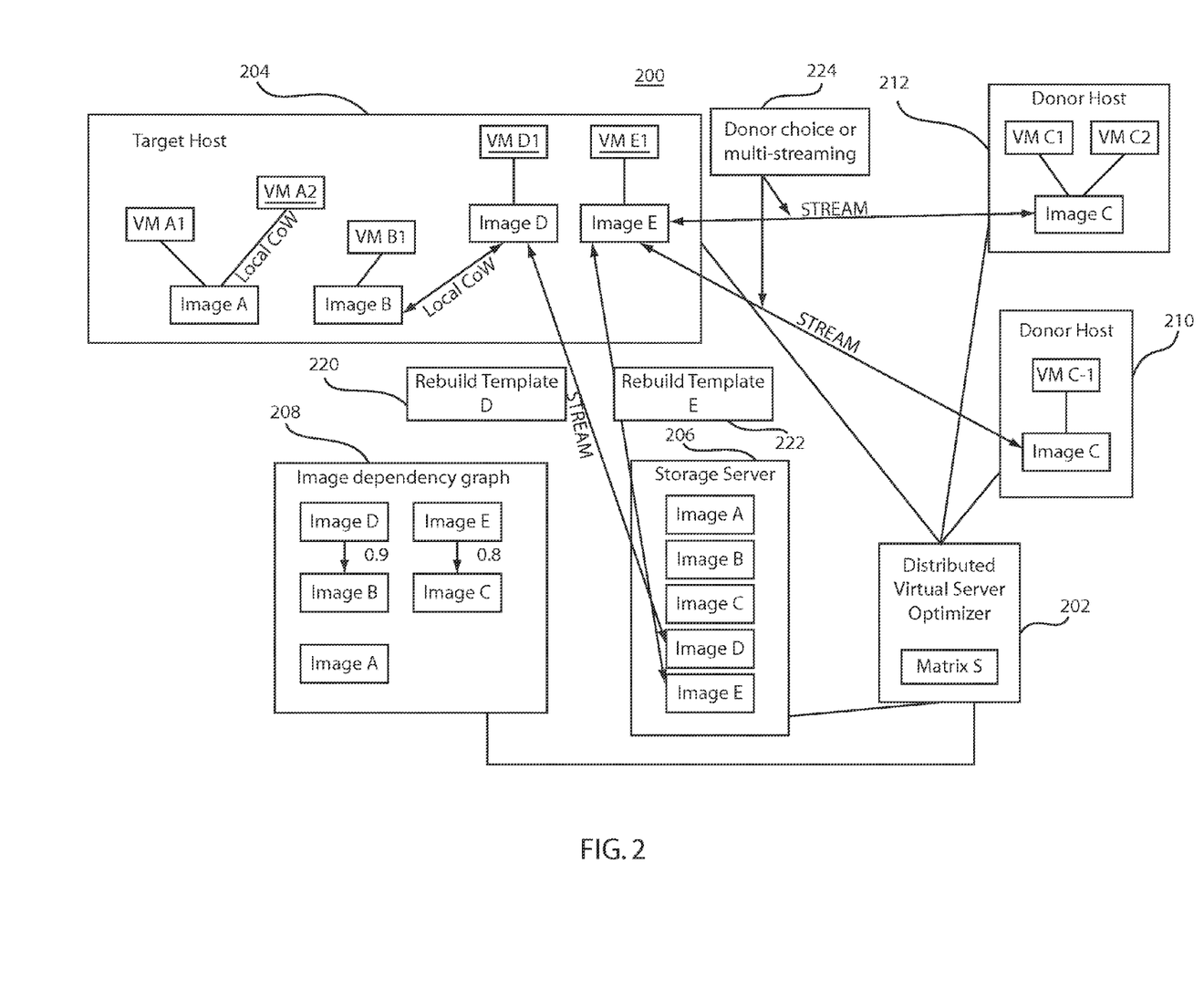
FIG. 2 is a block/flow diagram showing a system or network having new virtual machines deployed using a distributed virtual server optimizer in accordance with one embodiment.

Referring to FIG. 2, a network system 200 is shown in accordance with one illustrative embodiment. System 200 is preferably a distributed system that includes a plurality of nodes at a plurality of locations with a plurality of connections or links. In one embodiment, the nodes may include different client locations, which subscribe to cloud services or other services provided by service providers.

It is understood that the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

The cloud or other network may provide the following characteristics. On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

In the illustrative embodiment of FIG. 2, three nodes are shown to demonstrate the present principles. The nodes include a target host 204, a donor host 212 and a donor host 210. A storage server 206 which provides storage services to at least the target host 204 is provided. It should be understood that the network may include other equipment and that the nodes may be mobile, such as in vehicles, aircraft, trains, telephones, etc., or stationary, such as, server farms, data centers, homes, business locations, cell towers, etc. In one embodiment, the network operates in a cloud environment. The cloud environment may include a relatively small number of images or templates (e.g., in the hundreds). Significant data redundancy may exist across images (e.g., images A-E). In one example, a Red Hat Enterprise Linux (RHEL) image is very similar to an RHEL with DB2™ (available from IBM®) or RHEL with WebSphere Application Server™ (WAS™) (available from IBM®) as a small difference in their constituent blocks exists. Even private "checked-in" images also include high redundancy with other images. The network may include a very large number of hosts with roughly, e.g., 50 VMs per host.

In accordance with the present principles, a distributed virtual storage optimizer (DVSO) 202 is provided. The DVSO 202 may be located at a single location (e.g., on a target host 204) or distributed throughout the network (e.g., on donor hosts 210, 212 or other nodes). The DVSO 202 may include a program or module configured to carry out image rebuilding in accordance with the present principles. The DVSO 202 leverages redundancy across images (e.g., A-E) and the fact that with high probability significant fractions of the images needed to provision, a new image (e.g., a VM) are already present on the target host 204 (or on other hosts (210, 212) which are close in terms of network topology, e.g., same rack or low latency). The DVSO 202 further leverages this redundancy for both image (VM) provisioning and image (VM) migration, e.g., chances are that the host migrated to (or its close network neighbor) already has a significant fraction of the needed blocks to reconstruct an image. For many requests, the entire image is already on the target host. In one embodiment, placement of images in hosts and/or in server storage may be based on image similarity (e.g., place Windows™ VMs together). This will further boost performance.

The DVSO 202 generates an image or template similarity matrix, S, by comparing images. In this example, images A-E are compared and an image or template dependency graph 208 is generated. For two images, image D and B, S(D,B) is a fraction of blocks that images D and B have in common. In this example, the fraction is 0.9 for images D and B, and 0.8 for images E and C.

In the present example, the target host 204 needs to reconstruct images D and E. Images D and E can be reconstructed as follows. Images A and B are present on the target host 204. In addition, update virtual machines VM A1, VM A2, VM B1, VM D1, VM E1 are stored on the target server 204. The update VMs include data representing updates to the basic template image associated therewith. In this example, VM A2, VM D1 and VM E1 (with underlined labels) are new VMs, and VM A1 and VM B1 are existing VMs.

In the present setup, new VM instances D and E may be created on the target host 204 by creating a copy-on-write file based on read-only files or images A or B. Since the target host 204 needs to provision images D and E, the target host 204 checks in S which images can be used to build images D and E. Based on the similarity in S, the target host 204 checks whether images that it has in local storage are sufficient to rebuild images D and/or E.

In this case, image D can be rebuilt from a locally stored image B. Image D shares 90% of the same blocks with image B (fraction=0.9 from dependency graph 208). The target host 204 creates a copy-on-write image (Local CoW) based on local files found. The target host 204 may optionally flatten the file(s) for performance if the system is storage bound and no migrations are needed. Any remaining information (bytes, blocks, files) may be retrieved from image D in the storage server 206 (or host donors if available).

In a similar case, image E is sought to be reconstructed. Image E shares 80% of the same blocks with image C (fraction=0.8 from dependency graph 208). Image E can be rebuilt from an image C but there is no image C currently stored on the target host 204. The target host 204 creates a copy-on-write image for the blocks needed from donor hosts 210, 212 storing versions of image C. The target host 204 may optionally flatten the file(s) for performance. The donor hosts 210 and 212 include update VMs C-1, C1 and C2, which are not part of the template image C.

Not all of the needed images are on the local drive. The target host 204 may look for "donor hosts" to supply the needed images. A donor host is a host having the needed image or potentially having the needed image. A query to find donor hosts is realized either as a centralized query (e.g., in a Bit Torrent architecture with centralized tracker) or as peer to peer (P2P) query (e.g., in a Bit Torrent distributed tracker architecture). Existing mechanisms for such queries may be employed. If needed, an independent P2P overlay network may be employed to search for donor hosts. In the present example, no donor hosts where found to satisfy the remaining needed blocks to reconstruct image D. Therefore, the storage server 206 is accessed to stream the remaining images for rebuilding image D (in block 220) at the target host 204.

In the case where image E is to be reconstructed on the target host 204, the target host 204 had to look for "donor hosts" to supply the needed images. The search for donor hosts may include evaluating the quality of "donors" in terms of their utilization, network bandwidth to the donor hosts, latency, etc. The evaluating of donor hosts may be performed by the target host 204 or may be performed by the DVSO 202. The DVSO 202 may offer such evaluation as a service to hosts looking for a best fit donor host. The suitability of the host may be based upon performance criteria, security criteria or other preferences. A cost or bandwidth computation may be employed. In the present case, two donor hosts 210 and 212 were found. Note that the donor hosts 210 and 212 include image C. Since image E included 80% of the same blocks as image C (see dependency graph 208), a remaining part of the image E (which was not found on local storage of the target host 204 and/or donor hosts 210, 212) is streamed to the target host 204 from the storage server 206 in block 222. The target host 204 initiates image streaming from the donor hosts 210 and 212 and as soon as possible starts the VM even without all of the blocks to fully reconstruct the image.

Although images are described as being streamed from donor hosts and the storage server for provisioning, image migration (e.g., VM migration) may also be performed, like provisioning, except copy-on-write states related to the instance are transferred using streaming to a migration target host. It should be understood that since the images are reconstructed at the block level, the present principles provide a completely scalable reconstruction. Images of any size and complexity may be reconstructed using the present principles.

Figure 3:
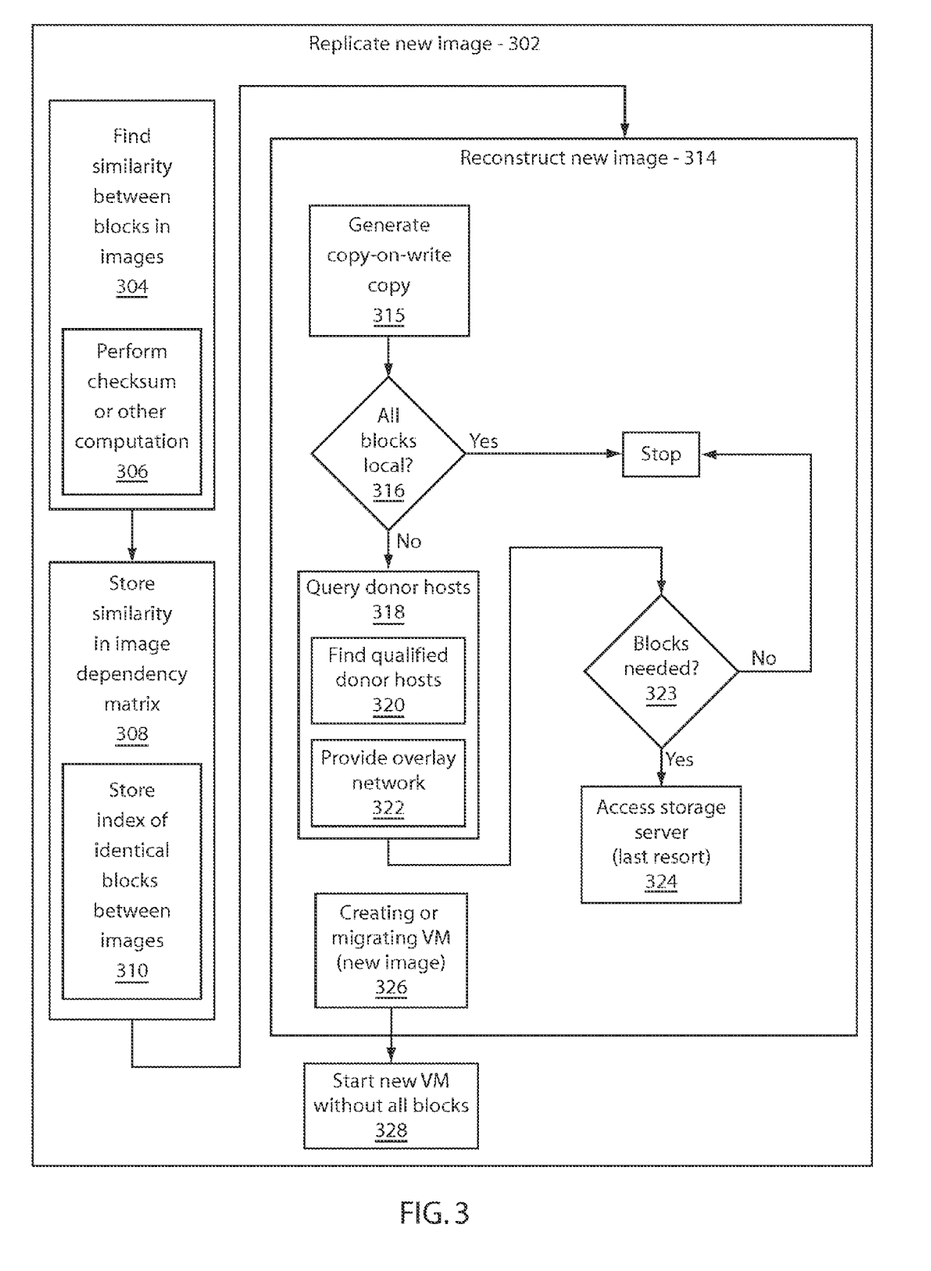
FIG. 3 is a block/flow diagram showing a system/method for deploying a virtual machine by reconstructing the virtual machine from local blocks in accordance with another embodiment.

Referring to FIG. 3, a block/flow diagram shows another system/method for reconstructing images in accordance with the present principles. In block 302, a new image is designated for replication. In block 304, a similarity between blocks of images is computed. In block 306, the similarity may be determined by performing a checksum on a byte-by-byte comparison between pairs of images with a same hashcode. Other similarity measures may be employed as well. In block 308, the similarity is preferably stored in an image dependency matrix denoting a fraction of blocks that are identical between two images. In block 310, the image dependency matrix may also store an index that indicates identical blocks between the pairs of images.

In block 314, the new image is reconstructed using similar blocks from other images locally disposed on the target host (device) or on donor hosts (devices) to reduce network link usage. In block 315, a copy-on-write copy of a locally available image is generated to construct the new image.

In block 316, if all blocks needed for the new image are not in local storage, donor hosts are queried in block 318 for the similar blocks to reconstruct the new image. In block 320, donor hosts are queried to determine a qualified donor host by evaluating criteria for a plurality of host donors. The criteria may include at least one of bandwidth, utilization, security, latency, cost, etc. In block 322, the querying may include providing an overlay network to search for donor hosts or employing existing network querying mechanisms.

In block 323, a determination is made as to whether any blocks are still needed. In block 324, a storage server is accessed to find remaining blocks needed to reconstruct the new image, as a last resort. In block 326, the new image may represent a virtual machine (VM) and reconstructing may include creating a new VM instance or migrating an existing VM instance. In block 328, the new VM may be started without all of the blocks of the new VM being locally available.

Having described preferred embodiments for scalable image distribution in virtualized server environments (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A non-transitory computer readable storage medium comprising a computer readable program, wherein the computer readable program when executed on a computer causes the computer to perform the steps of:

replicating an image representing a sequence of bytes on a local storage medium on a target device by:
determining a similarity between images; and
reconstructing a new image by copying data from equivalent blocks from one or more similar images locally available on the target device, or available on a best fit donor device if no similar images are locally available, to reduce network link usage and transfer time in replicating the image, wherein the new image represents a virtual machine (VM).

2. The computer readable storage medium as recited in claim 1, wherein determining a similarity includes performing a checksum on a byte-by-byte comparison between two blocks of images with a same hashcode.

3. The computer readable storage medium as recited in claim 1, wherein the similarity is stored in an image dependency matrix denoting a fraction of blocks that are identical between two images.

4. The computer readable storage medium as recited in claim 3, wherein the image dependency matrix includes an index for identical blocks between the two images.

5. The computer readable storage medium as recited in claim 1, wherein reconstructing includes querying donor devices for the equivalent blocks which are not available in local storage but are needed to reconstruct the image.

6. The computer readable storage medium as recited in claim 1, wherein reconstructing includes accessing a storage server to find remaining blocks needed to reconstruct the new image.

7. The computer readable storage medium as recited in claim 1, wherein reconstructing the new image includes creating a copy-on-write copy of the one or more similar images.

8. The computer readable storage medium as recited in claim 1, wherein the best fit donor device for reconstructing the new image is determined by evaluating at least one criteria for a plurality of donors from a set of qualified donors.

9. The computer readable storage medium as recited in claim 8, wherein the criteria includes at least one of bandwidth, utilization, security, latency, or cost.

10. The computer readable storage medium as recited in claim 8, wherein querying includes providing an overlay network to search for donors.

11. The computer readable storage medium as recited in claim 1, wherein the reconstructing includes creating a new VM instance or migrating an existing VM instance.

12. The computer readable storage medium as recited in claim 11, further comprising starting the new VM without all of the blocks of the new VM being locally available.

13. A non-transitory computer readable storage medium comprising a computer readable program, wherein the computer readable program when executed on a computer causes the computer to perform the steps of:

determining a similarity between images in a distributed network;
determining an image dependency matrix denoting a fraction of blocks that are identical between pairs of images;
searching local storage for blocks to reconstruct a new image using the image dependency matrix;
if all blocks needed for the new image are not in local storage, querying donor hosts for the blocks to determine a best fit donor host for reconstructing the new image using the image dependency matrix and copying data from the fraction of blocks that are identical between pairs of images, wherein the new image represents a virtual machine (VM); and if all blocks needed for the new VM are not in available from the donor hosts, accessing a storage server to find remaining blocks needed to reconstruct the new image.

14. The computer readable storage medium as recited in claim 13, wherein determining a similarity includes performing a checksum on a byte-by-byte comparison between two images with a same hashcode.

15. The computer readable storage medium as recited in claim 13, wherein determining an image dependency matrix includes storing an index for identical blocks between the pairs of images.

16. The computer readable storage medium as recited in claim 13, wherein searching local storage includes creating a copy-on-write copy of a locally available image to construct the new image.

17. The computer readable storage medium as recited in claim 13, wherein the best fit donor device for reconstructing the new image is determined by evaluating at least one criteria for a plurality of host donors from a set of qualified host donors.

18. The computer readable storage medium as recited in claim 17, wherein the criteria includes at least one of bandwidth, utilization, latency or cost.

19. The computer readable storage medium as recited in claim 13, wherein querying includes providing an overlay network to search for donor hosts.

20. The computer readable storage medium as recited in claim 13, wherein the method includes creating a new VM instance or migrating an existing VM instance.

21. The computer readable storage medium as recited in claim 20, further comprising starting the new VM without all of the blocks of the new VM being locally available.

22. A system, comprising:

a plurality of images stored on nodes of a distributed network;

a distributed virtual server optimizer (DVSO) stored on a non-transitory storage medium at one or more nodes in the network, the DVSO configured to compare images in the network to determine a similarity between blocks of the images and to generate a dependency matrix indicating the similarity between the images; and a target host configured to reconstruct a new image, the target host employing the dependency matrix to locally find similar images on the target host with needed blocks for reconstructing the new image, and, if not locally found, to find a best fit donor host to provide the needed blocks to reduce network link usage, the new image being reconstructed by copying data from equivalent blocks from one or more similar images locally available on the target device or available on the best fit donor hosts, wherein the new image represents a virtual machine (VM).

23. The system as recited in claim 22, wherein the similarity is stored in an image dependency matrix denoting a fraction of blocks that are identical between pairs of images.

* * * * *